March 28, 1939. L. H. VANDERWERF 2,152,511
HYDRAULIC STEERING MECHANISM FOR ROAD TRAILERS
Filed Jan. 21, 1937
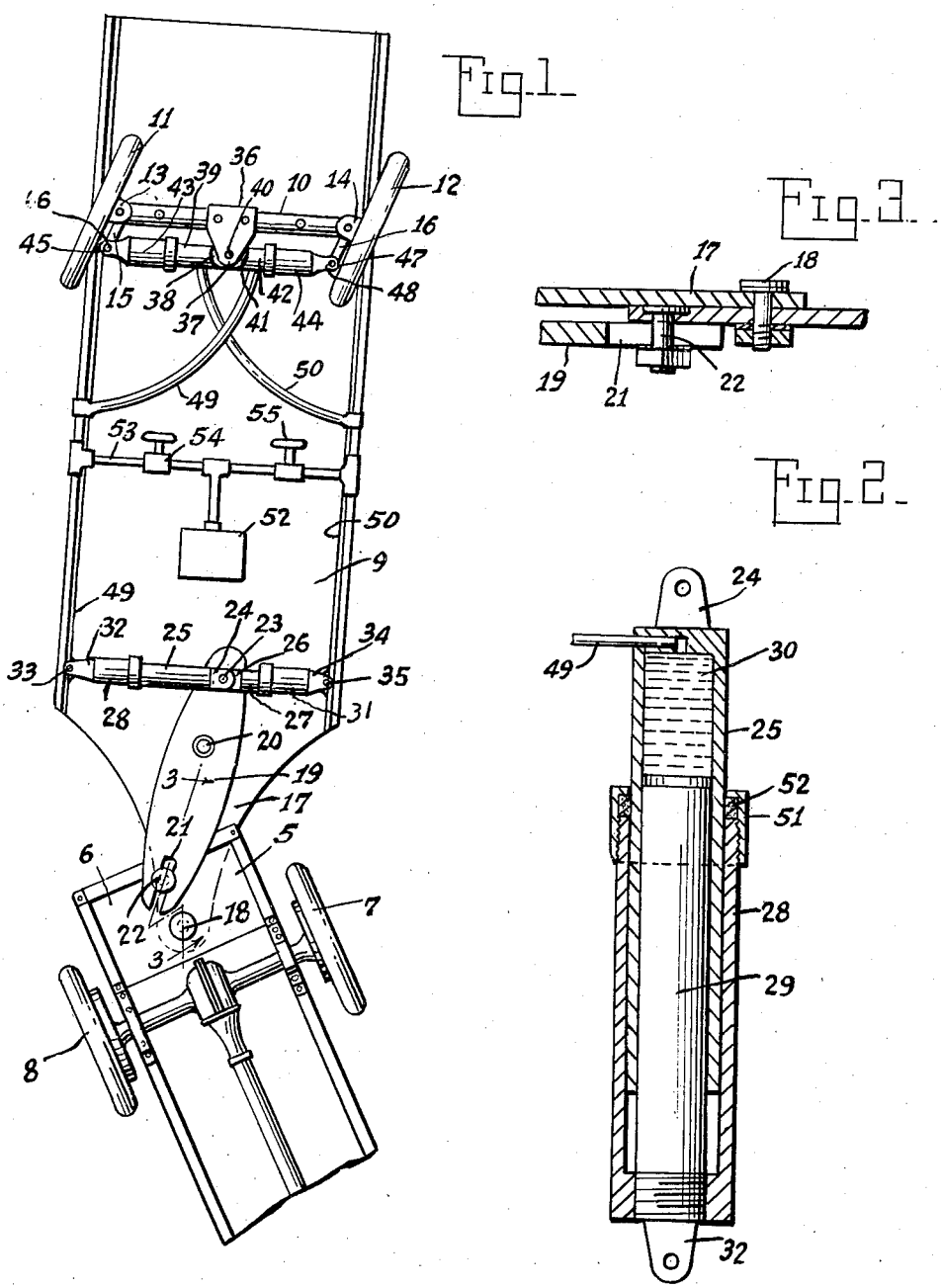
INVENTOR.
Leonard H. Vanderwerf Patented Mar. 28, 1939

2,152,511

UNITED STATES PATENT OFFICE 2,152,511

HYDRAULIC STEERING MECHANISM FOR ROAD TRAILERS

Leonard H. Vanderwerf, New York, N. Y.

Application January 21, 1937, Serial No. 121,538

8 Claims. (Cl. 280—33.55)

This invention relates to an improved steering mechanism for road trailers, and one of its objects is to provide a steering mechanism which utilizes hydraulic pressure to actuate operating pistons, and to transfer to the road wheels of a trailer steering motion corresponding to the steering or turning movement of the wheels of the pulling automobile or other motor driven road vehicle, so that the wheels of the trailer will follow the wheels of the automobile or other pulling road vehicle, and dangerous side road movement of the trailer, either to the right or left, will be resisted by hydraulic action.

Another object of the invention is to provide a mechanical lever for operating the hydraulic pressure means, which can be connected to the rear end of an automobile or other road vehicle, in such manner as may be necessary to maintain the correct motion of the trailer wheels, to compensate for any variations in the length or arrangement of the steering arms of the trailer wheels.

A still further object of the invention is the provision of a steering mechanism for road trailers, which includes a pair of operating hydraulic cylinders, and another pair of pressure cylinders, all of the cylinders being mounted under the trailer for pivotal movement, so that an efficient operation of the pistons working in the cylinders may be obtained.

A still further object of the invention is the construction of an improved hydraulic cylinder and piston set, wherein the working surfaces of both are protected against dust, and the pressure fluid or oil is safely retained against excessive waste or leakage, and the opposite ends of the combined device may be pivoted to the necessary parts of the trailer, so that each cylinder of the trailer steering mechanism will be mounted on the trailer for swinging movement.

With the above and other objects in view the invention consists in certain new and useful constructions and arrangements of parts, clearly described in the following specification, and fully illustrated in the drawing, in which:—

Fig. 1 is a bottom plan view, showing a trailer in road turning position with reference to the pulling road vehicle.

Fig. 2 is a longitudinal sectional view, enlarged, showing one of the hydraulic cylinders and its piston.

Fig. 3 is a longitudinal sectional view, taken on line 3—3 of Fig. 1, looking in the direction of the arrows, showing the connections between the trailer and the automobile or road vehicle.

Referring to the accompanying drawing 5 designates the rear end of an automobile or other road vehicle, which may be used for pleasure or commercial purposes. This rear end is equipped or provided with a rearwardly extending horizontal support 6, which extends rearwardly of the vertical plane of the rear ends of the rear road wheels 7 and 8.

The road trailer 9 is provided with an axle 10, on which the road wheels 11 and 12 are mounted, by the usual steering knuckles 13 and 14. The trailer wheel 11 is provided with a steering arm 15, which is rigidly connected with the pivot element of the steering knuckle carried by the wheel, and the trailer wheel 12 is provided with a similar steering arm 16.

The trailer body is provided with a forwardly extending tongue or arm 17, which is connected by the vertical pin 18 to the support 6, approximately midway of the sides of the support, as indicated in Fig. 1, and is preferably located over the support 6. Under this tongue or connecting arm 17 an operating lever 19 is pivotally secured by the pivot pin 20 to permit the lever to swing freely in a horizontal plane under the trailer, either to the right or to the left. The forward end of the lever is provided with a longitudinal slot 21 which receives the stud pin or bolt 22, fixed to the support 6 rearwardly of the connecting pivot pin 18, and in the same axial relation to the support 6, as said pin 18.

The rear end of the lever 19 is connected by the pivot pin or bolt 23 to inner end 24 of the hydraulic pressure generating piston cylinder 25 and by the same pin or bolt to the inner end 26 of the hydraulic pressure generating piston cylinder 27. The cylinder 25 works in another and dust protecting outer cylinder 28, in which the piston or plunger 29 is concentrically arranged, and to which it is rigidly connected, either by attachment or integral union. A pressure chamber 30 is provided between the outer end of the piston or plunger 29 and the opposing end of the piston cylinder 25. The cylinder 27 is similarly constructed and is provided with a combined protecting cylinder 31 and piston or plunger, duplicating that shown in Fig. 2.

The outer end cylinder 28 is provided with a rigid lug or bearing eye 32, which is pivotally connected by the pin or bolt 33 to the body of the trailer, or its platform, and the outer end of the cylinder 31 is provided with a similar lug or bearing eye 34, which is pivotally connected by the pin or bolt 35 to the underside of the trailer body or platform.

On the axle 10 a bracket 36 is rigidly secured, midway of its ends, and this bracket is provided with a forwardly extending bearing eye 37, to which the inner end 38 of the operating hydraulic piston cylinder 39 is pivoted by the pin 40, and to which the inner end 41 of the operating hydraulic piston cylinder 42 is pivoted. The pistons 39 and 42 are duplicates of the construction shown in Fig. 3, and work in protecting cylinders 43 and 44. The outer end of the cylinder 43 is provided with a bearing lug or eye 45, which is connected by the pivot 46 to the steering arm 15, and the outer end of the cylinder 44 is provided with a bearing lug or eye 47, which is connected to the steering arm 16 by the pivot 48.

The pressure cylinder 25 is connected to the operating hydraulic cylinder 39 by the flexible conduit 49, so that oil or other pressure fluid will be supplied to pressure chamber of the cylinder 42 from the cylinder 25, in which pressure is generated by the swinging motion of the lever 19. The pressure generating cylinder 27 is similarly connected by the hydraulic operating cylinder 39 by the flexible conduit 50, so that pressure will be transmitted from the generating chamber of the cylinder 27 to the pressure chamber of the cylinder 42.

By this arrangement the right pressure generating hydraulic cylinder of the trailer is caused to operate the left hydraulic operating piston, and the left pressure generating cylinder is caused to operate the right hydraulic operating piston.

The pressure chamber and pistons are approximately the same areas as the chambers and pistons of the hydraulic operating units, so that the amount of oil or other pressure fluid displaced in the pressure chambers of the hydraulic generating units will cause a corresponding movement of the operating pistons.

In order to seal the oil or pressure fluid against loss, and to protect the sliding bearing surfaces of the pistons and cylinders, the outer piston of each unit is equipped with a gland 51, which is threaded thereon, to subject the packing material 52 to compression around the cylinder which slides therein, as shown in Fig. 2.

The location of the intermediate pivot pin or bolt of the lever 19 may be varied and would be varied to compensate for differences in the lengths of the arms of the steering knuckles of the trailer wheels. By shifting the intermediate pin toward the forward end of the lever, greater movement will result on the rear end of the lever, than by locating the intermediate pivot midway of the ends of the lever.

When the automobile or other pulling road vehicle, usually of the motor driven type, turns along a curved road, to the right, as shown in Fig. 1, the lever 19 will be swung at its forward end to the left, and the rear end of the lever will be shifted toward the right, thus causing hydraulic pressure to be generated in the cylinder 31 and causing the cylinder 25 to move outwardly of its cylinder 28, thus developing negative pressure or partial vacuum. By the movement of the hydraulic pressure fluid in the flexible conduits 49 and 50 the opposite operating units will be operated to cause the trailer wheels to turn so that they will automatically follow the same traction path taken by the wheels of the automobile or other pulling motor driven road vehicle.

Due to the powerful hydraulic pressure developed the trailer wheels will be controlled against instability or wobbling, and the steering action will develop to control the trailer wheels so that they will travel in the traction path taken by the road wheels of the pulling motor driven vehicle. The trailer wheels will be caused to move at right angles to the radius line of the circle described by the road turning movement of the pulling vehicle.

In order to maintain the supply of oil or pressure fluid, I provide a supply tank 52, which supplies oil to the service lines, through the cross conduit 53, which is equipped with manual valves 54 and 55, so that the oil or other pressure fluid may be supplied to the pressure cylinders.

Having described my invention I claim as new:—

1. The combination with a motor driven road vehicle having a support on its rear end, a trailer having steerable road wheels and also having a forward member pivotally connected to the support, a lever pivoted on said forward member and having a bearing on the support, a pair of hydraulic cylinders arranged on the trailer, means pivotally connecting the cylinders to the trailer, pistons working in the cylinders, and means pivotally connecting the lever to the pistons, whereby hydraulic pressure is generated in said cylinders by the action of the pistons, and means actuated by said pressure for steering the trailer wheels.

2. A trailer having a body, a pair of wheels for supporting the body for rolling road movement, steering knuckles pivotally connecting the wheels to the body and each knuckle including a steering arm, a pair of hydraulic cylinders having pistons working therein located between the wheels, said combined cylinders and pistons being pivotally connected to each other and to the body in endwise relation and having their outer ends pivotally connected to the steering arms of the wheels, hydraulic means for producing pressure within the cylinders to cause movement of the pistons therein, means for connecting the forward end of the trailer to the rear end of an automobile, and means carried by the forward end of the trailer and constructed to permit of operative connection with the rear end of the connected automobile for operating the hydraulic means.

3. A trailer having a body, a pair of wheels having pivotal steering mounting on the body, means for pivotally connecting the forward end of the body to a motor driven vehicle, a pair of hydraulic operating units arranged between the wheels, each unit including a pressure cylinder and a piston working therein, means pivotally connecting the inner ends of the units to each other and to the trailer, means pivotally connecting the outer ends of the units to the steering means of the wheels, hydraulic pressure generating units located at the forward end of the trailer, each unit consisting of a pressure cylinder and a piston working therein, means pivotally connecting the outer ends of the units to the trailer, means pivotally connecting the inner ends of the units to each other, and a lever pivoted on the trailer and having pivotal connection with said units to produce a compression movement in one piston and a suction movement on the other piston, whereby the hydraulic operating units may be operated, said last units having conduit connections with the pressure generating units.

4. A hydraulic unit for operating steerable trailer wheels, consisting of a pair of hydraulic cylinders having pivoting lugs on their adjacent ends and pivotally connected to each other, a piston working in each cylinder having a pivoting lug on its outer end, means connecting said outer ends to the steering means of trailer wheels, a pair of similar hydraulic units pivotally connected to each other at their inner ends and pivotally connectible to a trailer at their outer ends, conduits connected to the first cylinders and connected to the last cylinders in crosswise relation, and a lever pivotable upon the trailer and having pivotal operating connection with the last named hydraulic units to produce hydraulic pressure therein when pivotally connected to a motor driven vehicle the rear end of which is pivotally connected to the trailer.

5. In combination with an automobile having a rear support, a road trailer having a forwardly extending arm pivoted on the support for lateral swinging movement and steerable wheels, a set of cylinders having their outers ends pivotally connected to the steering knuckles of the wheels, a hydraulically operated piston slidably engaged into each of said cylinders and said pistons having their inner ends pivotally connected together, a set of hydraulic pressure generating cylinders having their outer ends pivotally connected to opposite sides of said road trailer, a piston slidably engaged into each of said pressure generating cylinders and said pistons having their inner ends pivotally connected together, and flexible conduits connecting one of said hydraulic pressure generating cylinders with one of said hydraulically operated pistons, a second flexible conduit connecting the other of said hydraulically operated pistons to convey hydraulic pressures from said generating cylinders to said pistons to operate said pistons to cause said wheels to turn, and means for operating said generating cylinders to set up said hydraulic pressures.

6. In combination with a motor driven road vehicle and a trailer vehicle having steerable road wheels and being pivotally connected with the rear end of the driven vehicle, a pair of hydraulic cylinders pivotally mounted in end alignment with each other on one of said vehicles, a piston working in each of said cylinders and said pistons being directed towards each other, means for pivotally connecting together said pistons, a lever pivotally mounted intermediate of its ends on one of said vehicles and having one of its ends pivotally connected to said pistons at their pivotal point of connection and the other of its ends slidably pivotally connected with the other of said vehicles to operate said pistons when said driven vehicle is steered to generate hydraulic pressure in said cylinders, and means actuated by said pressure for the steering of said steerable wheels.

7. A trailer having a body, a pair of wheels steerably mounted on the body and including steering knuckles, means for pivotally connecting the forward end of the body to a driven vehicle, a pair of hydraulic operating units arranged between the wheels, each unit including a pressure cylinder and a piston working therein, means pivotally connecting together said pistons, means pivotally connecting the outer ends of the cylinders to the steering knuckles of the wheels, hydraulic pressure generating units located at the forward end of the trailer, each latter unit consisting of a pressure cylinder and a piston working therein, means pivotally connecting the outer ends of the cylinders to the trailer, means pivotally connecting together the pistons, and a lever pivotally mounted on said body and being pivotally connected with said motor driven vehicle and said latter units to produce a compression movement in one of said generating units and a negative movement in the other of said generating units, said generating units having conduit connections with said hydraulic operating units to cause said hydraulic operating units to steer said steerable wheels when said motor driven vehicle is steered to operate said generating units.

8. A hydraulic unit for operating steerable trailer wheels, comprising a pair of hydraulic cylinders having lugs on their outer ends, a piston working in each cylinder and each of said pistons being pivotally connected together, means pivotally connecting said lugs to the steering means of the trailer wheels, a pair of similar hydraulic units pivotally connected to each other at their inner ends and pivotally connected to said trailer at their outer ends, conduits connecting each of said hydraulic units to one of said hydraulic cylinders in crosswise relation and means for operating said hydraulic units to produce hydraulic pressure therein which will be conveyed to said hydraulic cylinders by said conduits to operate the same to steer said steerable trailer wheels.

LEONARD H. VANDERWERF.